United States Patent [19]

Rasmussen

[11] 4,061,888

[45] Dec. 6, 1977

[54] CONTROL UNIT MOUNTING AND INTERCONNECTING APPARATUS FOR TELEPHONE SETS

[75] Inventor: Harry R. Rasmussen, Tacoma, Wash.

[73] Assignee: Crest Industries, Inc., Puyallup, Wash.

[21] Appl. No.: 713,870

[22] Filed: Aug. 12, 1976

[51] Int. Cl.$^2$ ............................................ H04M 1/02
[52] U.S. Cl. ........................... 179/100 D; 179/100 R; 179/178
[58] Field of Search ............... 179/81 C, 84 L, 100 R, 179/100 D, 90 K, 99, 178, 179

[56] References Cited

U.S. PATENT DOCUMENTS

| 2,544,325 | 3/1951 | Johnson, Jr. et al. | 179/100 D |
| 3,632,892 | 1/1972 | McLaughlin et al. | 179/179 |
| 3,641,286 | 2/1972 | Berezowski | 179/90 K |

Primary Examiner—Kathleen H. Claffy
Assistant Examiner—Randall P. Myers
Attorney, Agent, or Firm—Christensen, O'Connor, Garrison & Havelka

[57] ABSTRACT

A control unit mounting and interconnecting apparatus for telephone desk sets is disclosed which includes a base member including a first plate portion for receiving a printed circuit board and configured to lie within and be supported by a metallic base of the telephone desk set. The base member also includes a second plate portion for supporting a control unit, such as one having a plurality of control keys, and a plurality of walls interconnecting the first plate portion and the second plate portion and defining a recess which slips over an upturned flange of the metallic base of the telephone desk set to maintain the base member in position when installed. Structure is provided in the base member for receiving a printed circuit interconnecting element, of flexible insulating material, which provides electrical interconnections between the control unit and the printed circuit board. An access aperture is provided in the second plate portion for receiving a removable access door to allow changing of bulbs used to illuminate keys of the control unit. Electrical connections to the bulbs in the control unit are provided, in part, by a flap of the printed circuit interconnecting element which can be manipulated through the access aperture.

10 Claims, 8 Drawing Figures

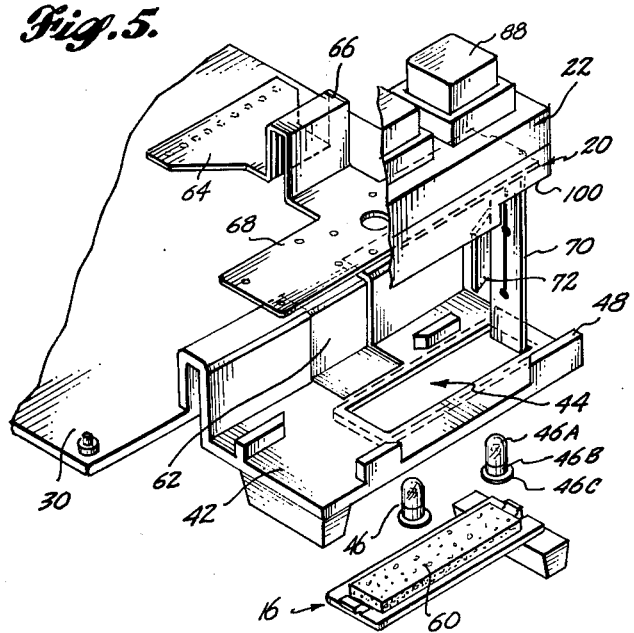
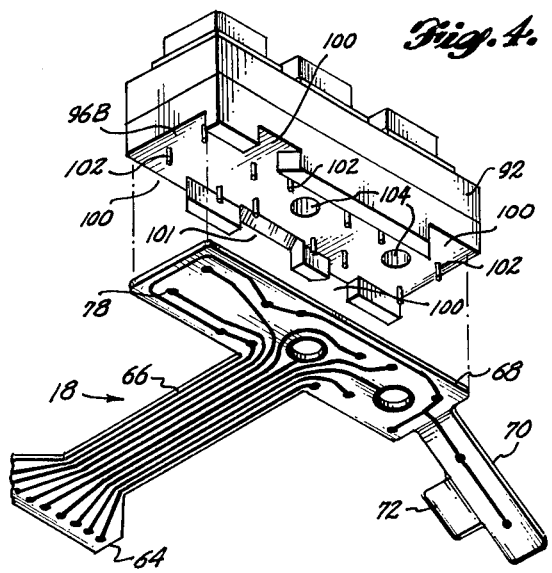
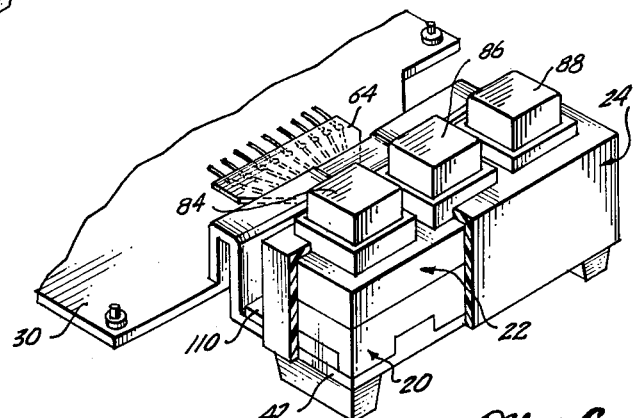
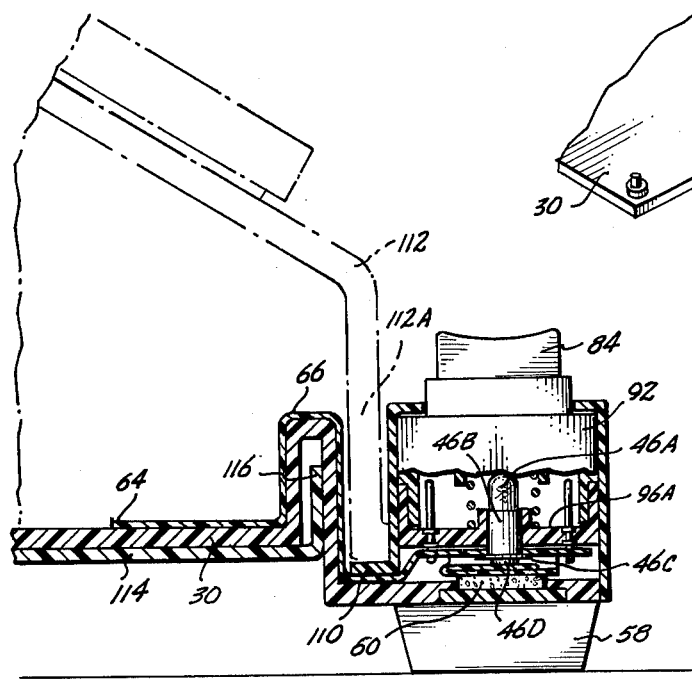
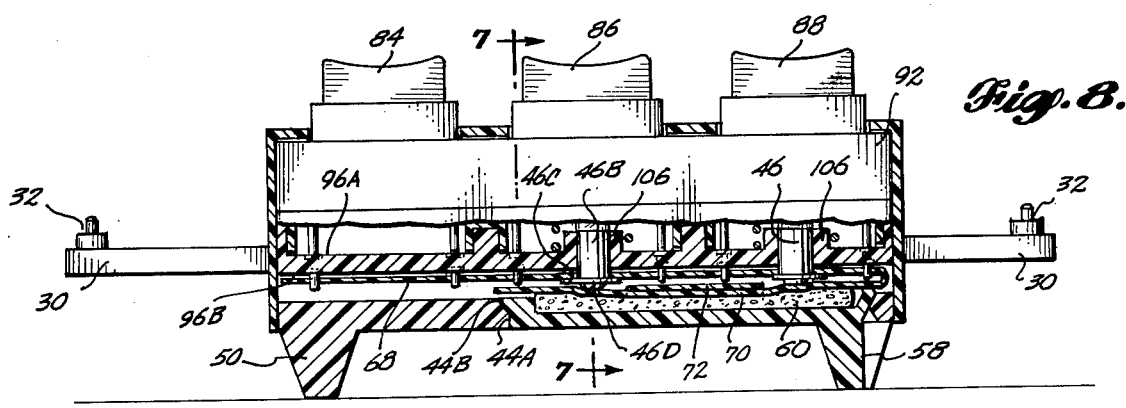

CONTROL UNIT MOUNTING AND INTERCONNECTING APPARATUS FOR TELEPHONE SETS

BACKGROUND OF THE INVENTION

This invention generally relates to telephone station apparatus, and more particularly, to control unit mounting and interconnecting apparatus for telephone desk sets.

It is common practice to utilize in conjunction with telephone desk sets various types of control units such as key switches, transfer switches, and so forth, which allow the telephone user to perform certain functions in addition to those normally provided by the telephone desk set. Examples of such additional functions are line hold functions, line transfer functions, intercom signaling functions, and bell shutoff functions. In some telephone desk sets, such as the common six-button key sets and those instruments marketed under the trademark "CALL DIRECTOR", the control unit is provided as an integral part of the desk set. However, it is desirable to have a more flexible arrangement in which the control unit can be specially adapted for the functions to be provided and utilized in conjunction with the common single line telephone desk set. In such case, the control unit is typically external to and separate from the telephone desk set. In such a case, it is necessary to provide electrical interconnections between the control unit and the telephone desk set or with a common junction box therefor. The electrical interconnections are typically provided by a cable.

Although such separate control units provide acceptable functional operation and allow flexible adaptation of single line telephone desk sets to multifunction use, the control units and cables result in an unsightly assemblage of parts on the desk and, in addition, are expensive of manufacture and costly to install due to the labor involved.

It is therefore an object of this invention to provide, for telephone desk sets, a combined, integral control unit mounting and interconnecting apparatus.

It is a further object of this invention to provide such a mounting and interconnecting apparatus which can be readily and inexpensively installed in a conventional single line telephone desk set.

It is another object of this invention to provide such a mounting and interconnecting apparatus which is inexpensive of manufacture.

SUMMARY OF THE INVENTION

Briefly, these objects and others which will be realized from a consideration of the following portion of the specification are achieved by providing, for a control unit having a plurality of electrical terminals arranged in spaced-apart relation on a base portion thereof, and for a telephone desk set which includes a substantially planar base having an upstanding peripheral flange and a removable cover having a down-standing peripheral wall extending over the flange in assembly, a base member including a first plate portion which has an upper surface and a substantially planar lower surface formed to lie on the substantially planar base of the telephone desk set and totally within the flange thereof. The base member also includes a second plate portion which is to be located external to the telephone desk set when the apparatus is assembled. This second plate portion has an upper surface formed to receive the base portion of the control unit, and a lower surface. Wall means of the base member join the first and the second plate portions, the wall means having an upper surface defining a recess for receiving a printed circuit interconnecting element and a lower surface for receiving a portion of the flange of the substantially planar base of the telephone desk set. A printed circuit interconnecting element includes a flexible insulating member formed into a first portion for overlying the first plate portion of the base member. A second portion of the printed circuit interconnecting element overlies the second plate portion and a strip joins the first and second portions for overlying the wall means thereof. A plurality of conductors are located on the flexible insulating member and have respective terminals in the first and second portions for permitting electrical connections to be made to the telephone desk set and to the plurality of electrical terminals of the control unit.

The invention also lies in such an apparatus in combination with a control unit which comprises a switch assembly means and a switch base means joined with the switch assembly means, the switch base means having a base portion including a planar web having a lower surface, a peripheral wall joined to the web and extending below the lower surface, at least one recess formed in the peripheral wall, and a plurality of terminal pins extending through the web for connection to the switch assembly means and to the terminals in the second portion of the printed circuit interconnecting element. The second plate portion has located thereon and upstanding from the upper surface at least one wall complementary to the recess in the peripheral wall of the switch base for locking the control unit into position on the second plate portion when assembly is completed. In this case, the printed circuit interconnecting element is interposed between the control unit and the second plate portion and is received within the peripheral wall of the switch base means and the upstanding wall of the second plate portion.

BRIEF DESCRIPTION OF THE DRAWINGS

The invention can perhaps best be understood by reference to the following portions of the specification, taken in conjunction with the accompanying drawings in which:

FIG. 4 is an exploded pictorial diagram showing the assembly of the printed circuit interconnecting element and the control unit;

FIG. 5 is an exploded pictorial diagram showing the installation of the assembled printed circuit interconnecting element and control unit with a base member of the invention;

FIG. 6 is a pictorial diagram showing the completed assembly of the invention;

FIG. 7 is a partial side elevation view showing the control unit as installed on the telephone desk set; and FIG. 8 is a partial front elevation view showing the control unit as installed.

DESCRIPTION OF A PREFERRED EMBODIMENT

Figure 1:
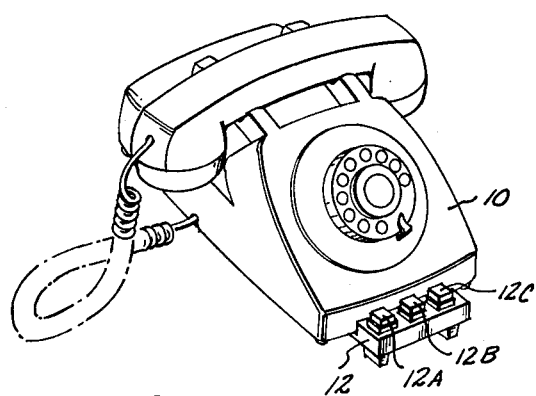
FIG. 1 is a pictorial diagram illustrating a conventional single line telephone desk set with a control unit installed therewith by use of the invention.

Referring now to FIG. 1, a conventional dial-type telephone desk set 10 is illustrated which may include, as partially illustrated in FIG. 7, a cover or housing member 112 and a supporting metallic base 114 having a surrounding, integral upstanding flange 116. The cover or housing 112 includes an integral, downstanding peripheral wall 112A which, in assembly, extends over the flange 116, as illustrated in FIG. 7. Although not illustrated, the telephone desk set 10 has supported on the base 114, and contained within the cover or housing 112, a conventional desk set apparatus such as dial mechanism, bell ringer, hook switch, and telephone line terminals.

A control unit 12, which in this case comprises a key switch assembly including three control keys or push button switches 12A, 12B, and 12C, is located at the front of the telephone desk set and is mounted thereon and electrically interconnected with the internal elements of telephone desk set 10 by the apparatus of the present invention, more completely illustrated in FIGS. 2-8.

Figure 2:
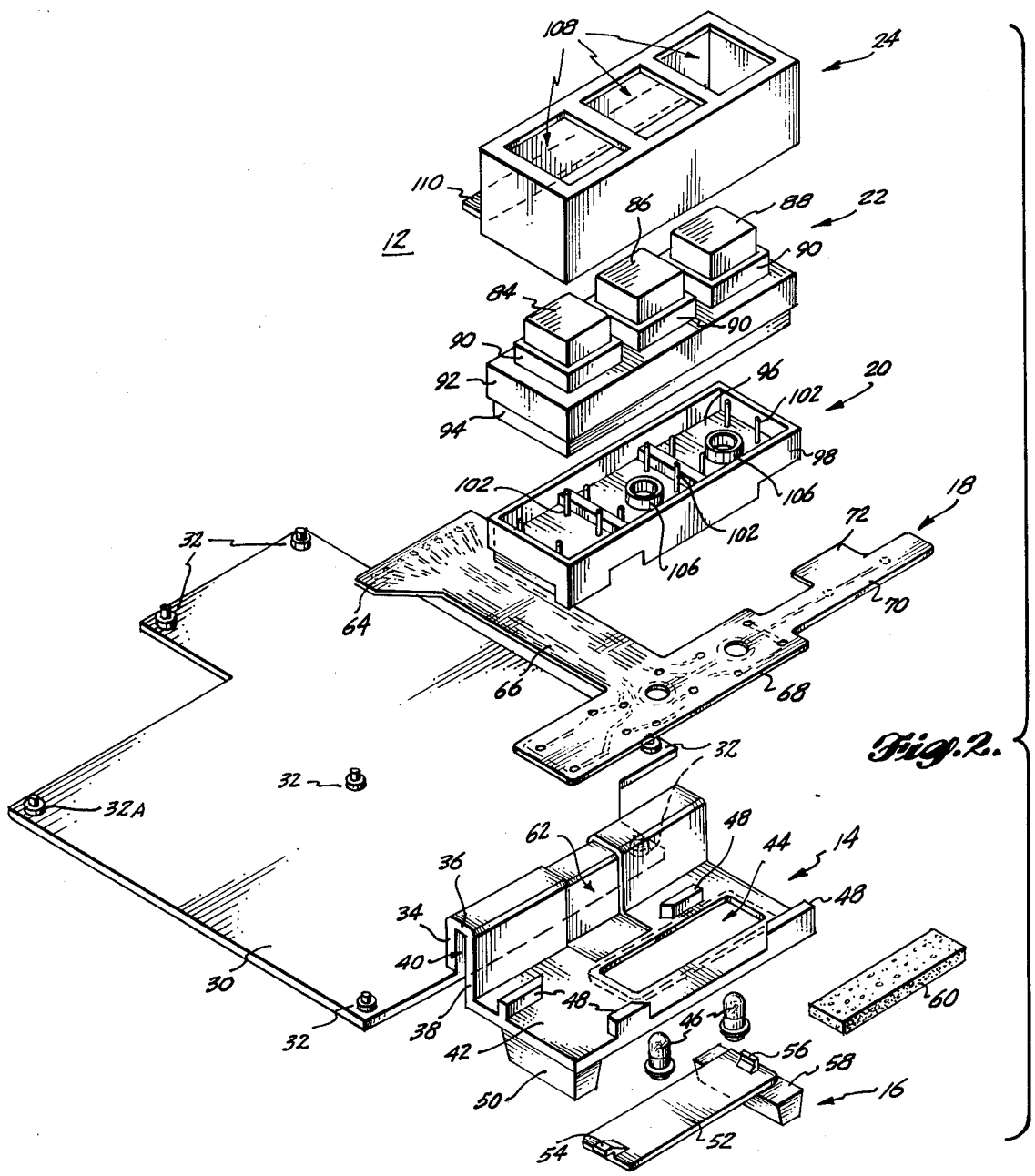
FIG. 2 is an exploded pictorial diagram showing the component elements of the mounting and interconnecting apparatus, and a typical control unit.

With particular reference to FIG. 2, the apparatus of the present invention is seen to comprise a base member 14 having a removable access door 16, a printed circuit interconnecting element 18 and a switch base member 20 adapted for receiving a switch assembly 22 which in turn is housed in a switch cover 24, with elements 22 and 24 both forming the control unit 12.

The base member 14 is preferably an integral, molded plastic piece and includes a first plate portion 30 whose length and width are designated to fit into the space provided on an upper surface of base 114 of the telephone desk set 10 and accordingly within the raised flange 116 thereof. Located on the integral with the first plate portion 30 are a plurality of pins 32 for insertion into corresponding apertures in a printed circuit board, not illustrated, which has mounted thereon various circuit elements necessary to respond to the control unit 12 in order to provide the desired telephone function to be afforded thereby. Each of the pins 32 has an enlarged-diameter base portion 32A which serves as a spacer member to elevate the printed circuit board above the first plate portion 30.

At one end of the first plate portion 30 there is, joined to and integral therewith, an upstanding first wall member 34 which is also joined to and integral with a second wall member 36 extending at right angles from wall member 34. A third wall member 38 is joined to and integral with second wall member 36 and depends downwardly therefrom at right angles so that wall members 34, 36 and 38 define a recess 40 which, as indicated in FIG. 7, receives the flange 116 of the telephone desk set base 114 so as to position the base member 14 with respect to the telephone desk set 10.

Joined to and integral with third wall member 38 is a second plate portion 42 which has defined therein a substantially rectangular bulb access aperture 44 which is closed by the removable access door 16. As will be explained in more detail hereinafter, bulbs 46 are utilized in the specific switch assembly 22 that is disclosed and are inserted through the bulb access aperture 44 when the access door 16 is removed. Located on an upper surface of second plate portion 42 and outstanding therefrom are a plurality of walls 48 each having a location and configuration designed to mate with corresponding walls on the switch base 20 to be hereinafter described.

A first support foot 50 is integral with and depends downwardly from second plate portion 42 for supporting second plate portion 42 on a desk or other surface on which the telephone desk set 10 is located. A second support foot 58 is integral with and depends downwardly from a plate member 52 of access door 16 which also has first and second integral tabs 54, 56, to engage the sides of second plate portion 42 defining bulb access aperture 44 to maintain access door 16 in position. As most clearly shown in FIG. 8, the bulb aperture access 44 is defined by walls 44A configured to receive the plate member 52, with the tabs 54 and 56 bearing in assembly against overcut portions 44B or walls 44A. In such a manner, additional support for second plate portion 42 is afforded by support foot 58.

A strip 60 of compressible material, such as foam rubber, is secured, by means of glue or similar adhesive material, to the upper surface of plate number 52 so that the strip 60 projects through bulb access aperture 44, when the access door 16 is installed, to bear against a portion of printed circuit interconnecting element 18 for the purposes hereinafter described.

Figure 3:
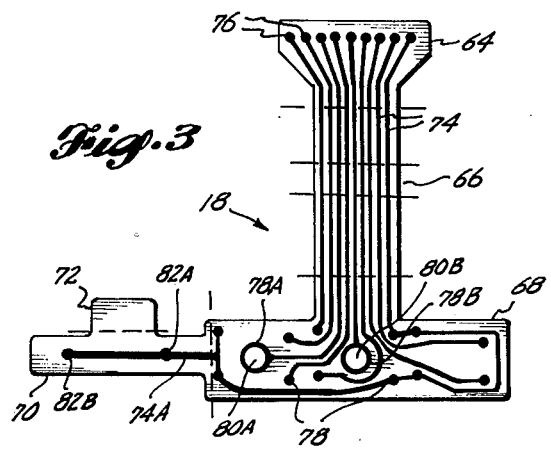
FIG. 3 is a plan view of a printed circuit interconnecting element forming part of the invention.

The printed circuit interconnecting element 18, best seen in FIGS. 2 and 3, comprises a flexible insulating member suitable for having located thereon metallic printed circuit conducting elements. A typical material for printed circuit interconnecting element 18 would be that marketed under the trademark "MYLAR". The element 18 includes a flared portion 64 which, in assembly, underlies the printed circuit board, not illustrated, to be located on the first plate portion 30, a rectangular portion 68 configured to be received in and lie on top of the second plate portion 42, a strip 66 joining the flared portion 64 and the rectangular portion 68, a first flap 70 extending from one end of the rectangular portion 68, and a second flap 72 extending from one portion of the first flap 70. As can be particularly noted in FIGS. 2 and 5, a recess 62 is provided in the upper surfaces of second plate portion 42, and walls 38, 36 and 34 for receiving the strip 66 of the printed circuit interconnecting element 18, as hereinafter described.

Located on a lower surface of printed circuit interconnecting element 18 (FIG. 3) are a plurality of printed circuit conductors 74 which are deposited on the underlying flexible plastic member thereof by conventional printed circuit deposition techniques. The conductors 74 terminate, in the flared portion 64, in a corresponding plurality of terminals 76 to which are made solder connections to the corresponding circuit points on the printed circuit board, not illustrated. In the rectangular portion 68 of printed circuit interconnecting element 18, the printed circuit conductors 74 terminate in a plurality of terminals 78 including two bulb-contact terminal portions 78A, 78B respectively surrounding bulb-receiving apertures 80A, 80B. As can be seen from FIG. 3, one of the printed circuit conductors 74A is extended onto the flap 70 and terminates therein in two spaced-apart contact portions 82A, 82B.

The location of terminals 78 on rectangular portion 68 corresponds with the locations of a plurality of conducting pins 106 located in the switch base member 20. More specifically, switch base member 20 includes a central web portion 96 having an upper surface 96A and a lower surface 96B above which and below which the conducting pins 102 extend (FIGS. 2, 7 and 8). The web 96 also defines a plurality of apertures 104 which extend through web 96 between the upper and lower surfaces 96A, 96B and which are surrounded on the upper surface 96A by a corresponding plurality of circumferential, upstanding walls 106 integral with web 96. The switch base member 20 also includes a peripheral wall 98 surrounding and integral with web 96 and defining, below web 96, a plurality of recesses 100 (FIG. 5) complementary with walls 48 on second plate portion 42 of the base member 14, and a recess 101 for receiving the strip 66 of printed circuit interconnecting element 18.

The structure comprising the switch base 20, and particularly that above the upper surface 96A of web 96, is designed to receive and mate with the switch assembly 22. More specifically, switch assembly 22 includes a switch body 92 (FIG. 2) having located in an upper surface thereof a plurality of rectangular sleeves 90 which in turn support, for reciprocative movement, rectangular push buttons 84, 86 and 88 serving as actuators for the control keys 12A, 12B, and 12C, respectively. The switch body 92 also includes a reduced-area, lower portion 94 which is dimensioned to be received within the portion of peripheral wall 98 of switch base 20 upstanding above the web 96.

The switch assembly 22 is similar to one that is commercially available from the Grayhill Company as its Series 82, three-button switch and includes mechanical switch contacts and switch actuators, not illustrated, designed to electrically and mechanically interconnect with the plurality of conducting pins 102 and to provide switch contact actuation upon depression of the corresponding push buttons 84, 86 and 88. In addition, the rectangular push buttons 86 and 88 are of a translucent material and the internal structure of switch assembly 22 is such so as to permit the insertion therein of bulbs, such as bulbs 46, for illumination purposes. Accordingly, the apertures 104 in switch base member 20 underlie the pushbuttons 86 and 88 and have their center lines aligned, in assembly, with the center lines of pushbuttons 86 and 88.

In assembly, as illustrated in FIG. 4, the switch assembly 22 is first mated with the switch base 20 by insertion of the reduced area portion 94 therein. If desired, the switch base 20 is retained on switch assembly 22 by adhesive material. Thereafter, the printed circuit interconnecting element 18 is installed by pressing the rectangular portion 68 against the lower surface 96B so that the pins 102 are received in the corresponding terminals 78 on rectangular portion 68. Electrical interconnections are then made by soldering the pins 102 to the corresponding terminals 78. It will be noted that after this assembly step, the strip 66 of printed circuit interconnecting element 18 lies in and extends through recess 101.

With reference now to FIG. 5, strip 66 is folded at the score positions indicated in FIG. 3, so that the strip 66 generally conforms to the configuration of the surfaces of second plate portion 42, and walls, 38, 36 and 34 defining recess 62. In addition, the flap 70 is folded downwardly at the score position also indicated in FIG. 3 and the flap 72 thereon is folded inwardly, toward the upper surface of flap 70 bearing conductor 74A, again at the score position indicated in FIG. 3. The assembly just described is then lowered onto the second plate portion 42 with flaps 70 and 72 being drawn through the bulb access aperture 44 and strip 66 being received in the recess 62. In this step, the walls 48 on second plate portion 42 enter the corresponding recesses 100 on switch base 20 to lock the switch base 20 into position.

If desired, the tolerances of walls 48 and recesses 100 may be such as to retain switch base 20 on second plate portion 42 by frictional inter-engagement. However, it may also be desirable to secure the assemblage by adhesive material. At this time, the printed circuit board, not illustrated, may be electrically interconnected with the terminals 76 in flared portion 64 and installed on the first plate portion 30 by inter-engagement of corresponding apertures therein with pins 32.

The assembly is completed by installing the switch cover 24 (FIGS. 2, 6, 7, and 8) which includes a plurality of rectangular apertures 108 in an upper surface thereof through which the pushbuttons 84, 86 and 88 protrude and which are dimensioned to frictionally engage with the sleeves 90 of switch assembly 22. The switch cover 24 additionally includes a lip 110 integral therewith which, in assembly, overlies the section of second plate portion 42 intermediate the switch base 20 and the wall 38 to provide protection for the strip 66. In addition, when the desk set cover 112 is re-installed on the desk set, the lower front edge of downstanding wall 112A thereof bears against lip 110 to retain the switch cover 24, and the printed circuit interconnecting element 18, in place.

During the assembly steps, it was noted that flaps 70 and 72 were drawn through the bulb aperture access 44. To install the bulbs 46, after the assembly has been completed, the bulbs 46 are inserted through the bulb access aperture 44 (FIG. 5) and further with their bulb portions 46A pushed through the apertures 80A, 80B in rectangular portion 68 and through the apertures 104 in web 96 until the enlarged-diameter bases 46B thereof frictionally engage the portions of web 96 and the circumferential walls 106 defining apertures 104. At this time circumferential flanges 46C on the bases of the bulbs 46 bear against the enlarged terminal portions 78A, 78B in rectangular portion 68 (FIGS. 7 and 8). It will also be noted that the insulated, central contact portion 46D of each bulb 46 protrudes below rectangular portion 68 as installed. Then the flap 72 is folded completely against flap 70 to overlie, and therefore insulate, the portion of conductor 74A intermediate contacts 82B and 82A. The flap 70, with folded flap 72, is then folded upwardly until the contacts 82A, 82B, underlie the insulated contact portions 46D of bulbs 46. At this time, the access door 16 is inserted and shaped into place whereby the strip 60 of compressible material bears against flap 70 to maintain contacts 82A, 82B in engagement with the central contact portions 46D.

The changing of bulbs 46 is therefore extremely simple in that only access door 16 has to be removed, the flap 70 folded downwardly, the bulb 46 exchanged, flap 70 folded upwardly again, and access door 16 being replaced.

It therefore should be apparent to those skilled in the art that the present invention provides a simple and inexpensive apparatus for mounting a control unit in connection with a conventional single line telephone desk set and yet permitting, in the same apparatus, interconnection of the control unit with the circuitry of the telephone desk set. Although the invention has been described in terms of a preferred embodiment, it is to be clearly understood by those skilled in the art that the invention is not limited thereto, but rather is to be interpreted only in light of the appended claims.

What is claimed is:

1. An apparatus for mounting a control unit, the control unit comprising manually-operable switch means having a base portion on which are arranged, in spaced-apart relation, a plurality of electrical switch terminals, on a telephone desk set which includes a substantially planar base having an upstanding peripheral flange and a removable cover having a downstanding peripheral wall extending over the flange in assembly, and for electrically interconnecting the electrical switch terminals of the control unit with a plurality of electrical terminals located on a printed circuit board to be installed within the telephone desk set, said apparatus comprising:

a. a base member including a first plate portion for supporting the printed circuit board within the telephone desk set, said first plate portion having an upper surface and a substantially planar lower surface formed to lie on the substantially planar base totally within the flange thereof, a second plate portion which is to be located external to the telephone desk set in assembly, said second plate portion having an upper surface formed to receive the base portion of the control unit, and a lower surface and wall means joining said first and second plate portions, said wall means having an upper surface defining a recess for receiving a printed circuit interconnecting element and a lower surface defining a recess for receiving a portion of the flange of the substantially planar base; and, b. a printed circuit interconnecting element including a flexible insulating member formed into a first portion for overlying said first plate portion, a second portion for overlying said second plate portion, and a strip joining said first and said second portions for overlying said wall means and further including a plurality of conductors located on said flexible insulating member and having respective terminals in said first and said second portions adapted to be electrically connected to the plurality of electrical terminals located on the printed circuit board within the telephone desk set and to the plurality of electrical switch terminals of the control unit, respectively.

2. An apparatus as recited in claim 1, wherein said first plate portion includes a plurality of pin means upstanding from said upper surface thereof for supporting the printed circuit board.

3. An apparatus as recited in claim 1, wherein said second plate portion includes foot means downstanding from said lower surface thereof for supporting said second plate portion from a support surface on which said telephone desk is located.

4. An apparatus as recited in claim 1, wherein said second plate portion defines therein an aperture extending between said upper and lower surfaces for permitting access to the control unit, and further including an access door for closing said aperture, and means removably securing said access door to said second plate portion.

5. An apparatus as recited in claim 1, in combination with a control unit comprising manually-operable switch means, said switch means being formed from a switch assembly means, and a switch base means joined with said switch assembly means and having a base portion including a planar web having a lower surface, a peripheral wall joined to said web and extending below said lower surface thereof, at least one recess being formed in said peripheral wall, and a plurality of terminal pins for said manually-operable switch means which extend through said web, said plurality of terminal pins being adapted to be electrically connected to said terminals in said second portion of said printed circuit interconnecting element; wherein said second plate portion has located thereon and upstanding from said upper surface at least one wall complementary to said at least one recess to lock said control unit into position on said second plate portion when assembled thereto with said printed circuit interconnecting element being interposed therebetween and received within said peripheral wall of said switch base means and said at least one wall of said second base member.

6. The combination as recited in claim 5, wherein said second plate portion defines therein an access aperture extending between said upper and lower surfaces for permitting access to the control unit, and further including an access door for closing said access aperture, and means removably securing said access door to second plate portion.

7. The combination as recited in claim 6, wherein said web has defined therein at least one aperture aligned with said access aperture for receiving and retaining a bulb for illuminating said switch assembly means, the bulb including a bulb portion which is frictionally engaged by said web when inserted through said at least one aperture therein to retain the bulb, the bulb also having a first conductive member including a conductive base and an enlarged, conductive circumferential flange, and a second conductive member including an insulated, central contact portion depending from the first conductive member; wherein said second portion of said printed circuit interconnecting element has defined therein at least one aperture which is aligned with said at least one aperture in said web in assembly, and wherein said plurality of conductors are located on a surface of said flexible insulating member proximate, in assembly, to said upper surface of said second plate portion, said plurality of conductors including a first terminal surrounding said aperture and said second portion for engaging said enlarged conductive circumferential flange of the bulb when inserted through said access aperture and into said at least one aperture of said web, and means for coupling one of said plurality of conductors to the insulated, central contact portion of the bulb when inserted.

8. The combination as recited in claim 7, wherein said coupling means comprises a flap forming part of and integral with said second portion of said flexible insulating member of said printed circuit interconnecting element, said flap being capable of being folded and unfolded through said access aperture about a predetermined line to, when folded, underlie said second portion of said printed circuit interconnecting element and, when unfolded, to expose said bulb aperture therein to said access aperture, said flap having located on the lower surface thereof an extension of one of said plurality of conductors which has a terminal located on said flap so as to be aligned with said at least one aperture in said second portion of said interconnecting element when said flap is folded to provide electrical contact between said terminal on said flap and the insulated central contact portion of the bulb.

9. The combination as recited in claim 8, further comprising a strip of compressible material located on said removable access door for pressing said flap against the bulb to provide positive electrical connection between said terminal on said flap and the insulated central contact portion of the bulb when said access door is secured to said second plate portion.

10. The combination as recited in claim 5, wherein said control unit further comprises a cover for said switch assembly means and switch base means, said cover including a lip integral therewith which, in assembly, overlies a section of said second plate portion intermediate said switch base means and said wall means, said cover being retained in place by engagement of said lip with the downstanding peripheral wall of the removable cover of the telephone desk set.

* * * * *